United States Patent [19]

Johnson et al.

[11] 4,361,746

[45] Nov. 30, 1982

[54] UNDERWATER CUTTING AND WELDING TORCH

[75] Inventors: David E. Johnson, Pataskala; Alexander Toth, Lancaster, both of Ohio

[73] Assignee: Air Products and Chemicals, Inc., Allentown, Pa.

[21] Appl. No.: 198,376

[22] Filed: Oct. 20, 1980

[51] Int. Cl.³ .............................................. B23K 9/00
[52] U.S. Cl. ..................................... 219/70; 219/136; 219/138
[58] Field of Search ......................... 219/70, 136, 138; 339/270 R; 279/48

[56] References Cited

U.S. PATENT DOCUMENTS

| 301,058 | 6/1884 | Ives ...................................... 279/48 |
| 2,210,640 | 8/1940 | Swafford . |
| 2,396,307 | 3/1946 | Watlerman . |
| 2,416,278 | 2/1947 | Austin . |
| 2,417,650 | 3/1947 | Kandel . |
| 2,462,463 | 2/1949 | Boot . |
| 2,531,450 | 11/1950 | Mackiewicz . |
| 3,223,817 | 12/1965 | Arena . |
| 3,651,302 | 3/1972 | Maddison .............................. 219/70 |
| 3,751,675 | 8/1973 | Hummel . |
| 4,131,780 | 12/1978 | Trabbold . |

FOREIGN PATENT DOCUMENTS 2337175 10/1972 Fed. Rep. of Germany ........ 279/48
2743503 6/1978 Fed. Rep. of Germany ........ 279/48

Primary Examiner—Elliot A. Goldberg
Attorney, Agent, or Firm—James C. Simmons; E. Eugene Innis

[57] ABSTRACT

An underwater cutting and welding torch including a one-piece insulating body anatomically shaped for the hand of a user including positive means to prevent water from contacting the electrically conducting parts of the torch and to prevent working fluid (e.g. oxygen gas) from escaping from the torch. Also included are improved electrode gripping means, flow and flash arresting means and variable positioning means for the gas valve.

6 Claims, 8 Drawing Figures

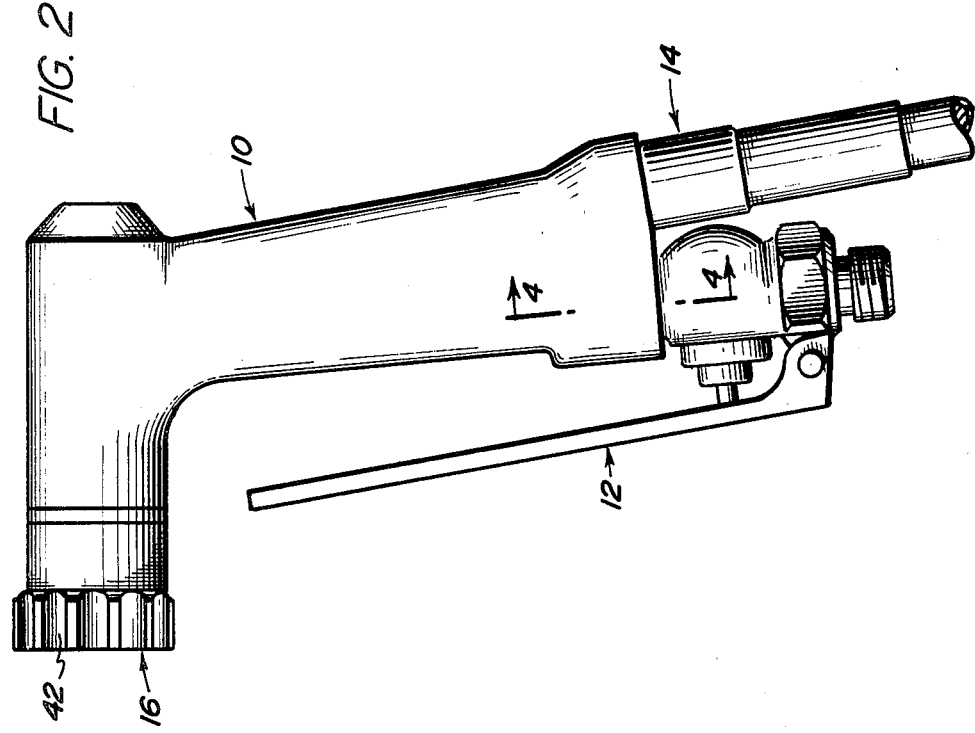
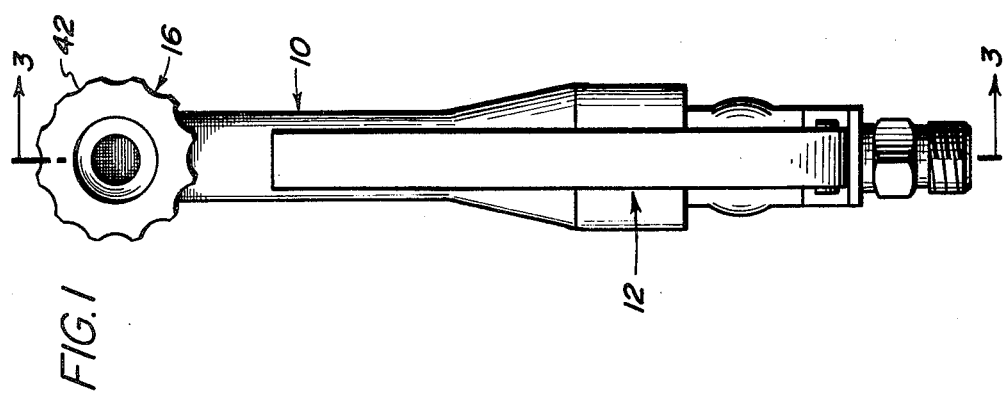

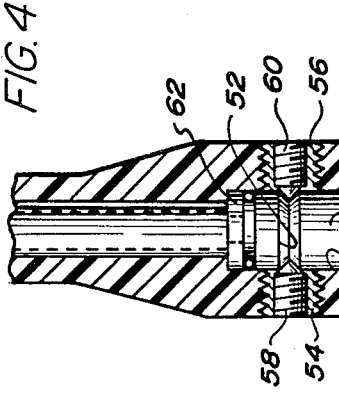
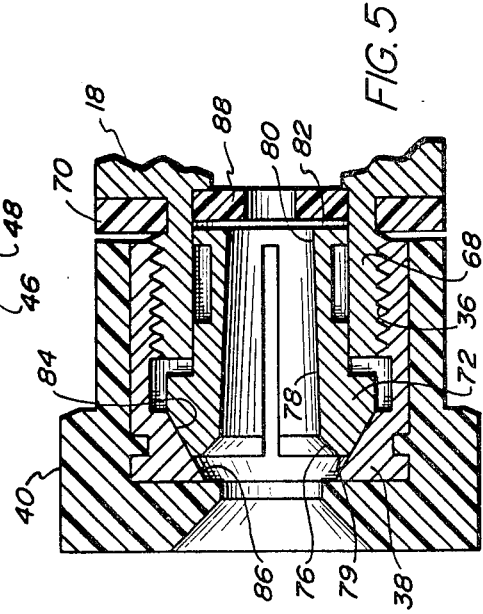
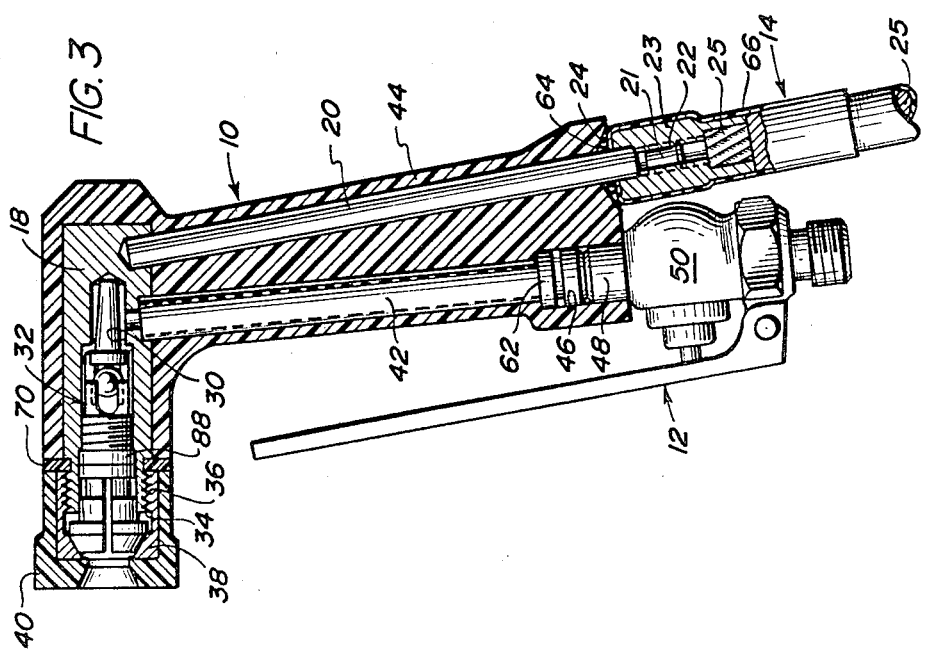

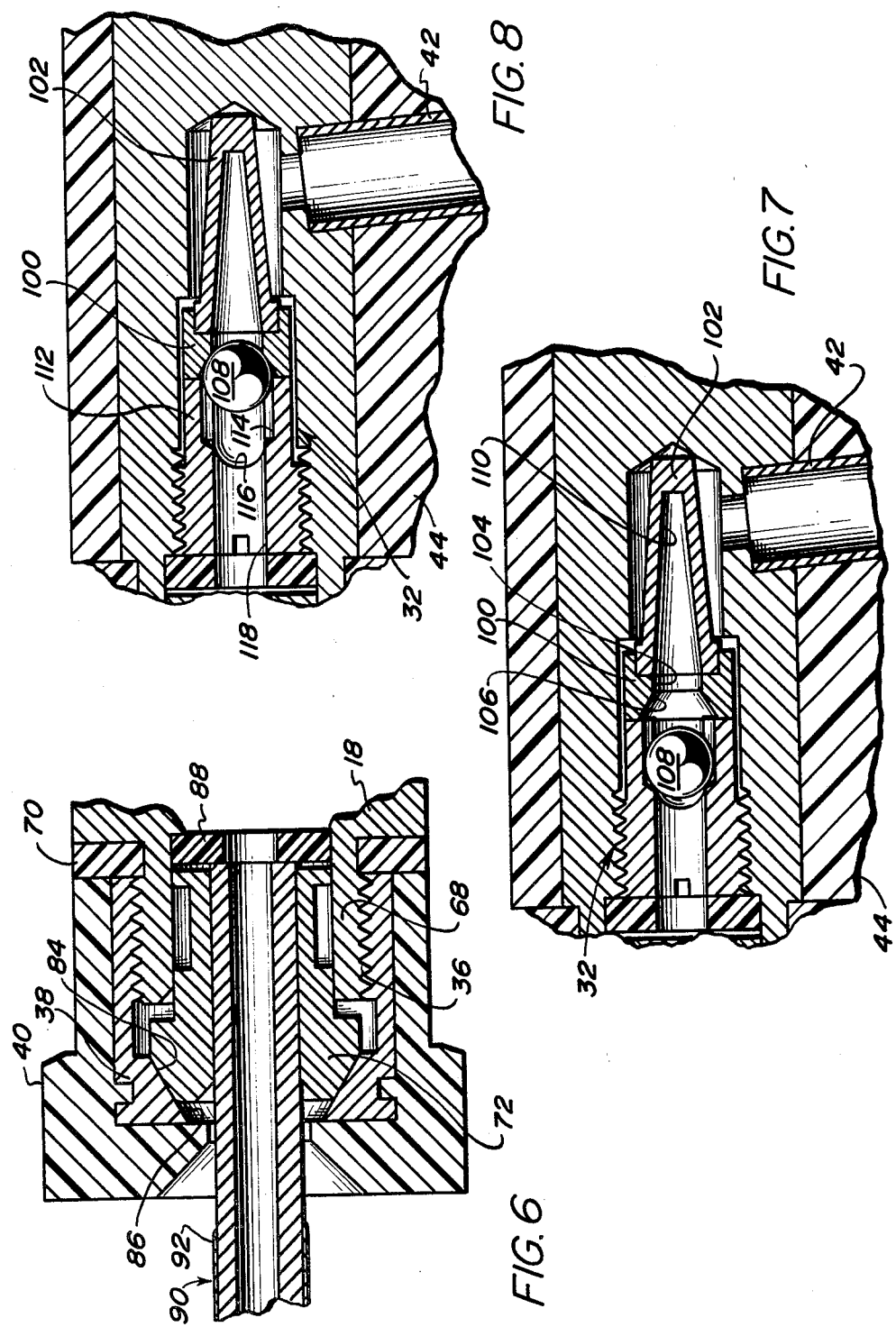

UNDERWATER CUTTING AND WELDING TORCH

TECHNICAL FIELD

This invention pertains to electric-arc cutting and welding torches and in particular to electric-arc cutting and welding torches for use under water. Torches of this type are commonly used in salvaging sunken vessels, repairing floating vessels such as ships, barges and the like; and in construction and maintenance of fixed structures such as bridges, docks and offshore drilling platforms.

BACKGROUND OF THE PRIOR ART

A U.S. Pat. No. 2,417,650 discloses the most commonly used type of underwater electric-arc cutting and welding torch. In the U.S. Pat. No. 2,417,650 patent a torch is shown having a gas valve to admit a working fluid such as oxygen to the interior of the torch and to an internal bore in a cutting electrode. The electrode is held in the torch by a spring collet caused to circumferentially grip the electrode by means of a collet ring assembly. Means are provided to conduct electricity to the electrode and all electrical portions of the torch which could be touched by the user (diver) are provided with insulating coatings.

U.S. Pat. No. 3,751,625 discloses and claims a torch which was an attempted improvement over the torch of the U.S. Pat. No. 2,417,650 patent in the method of gripping the electrode. As pointed out in the specification of the U.S. Pat. No. 3,751,625 patent the frequent breaking and restarting of the electric arc could cause the electrode to loosen by turning of the collet assembly. This frequently happened because of the essentially line contact of the collet with the circumference of the electrode.

Torches of the prior art did not permit repositioning of the gas valve assembly and were usually made in multiple parts fitted together with mechanical locking means and an overall insulating envelope.

In addition to the foregoing patents U.S. Pat. Nos. 2,210,640; 2,396,307; 2,416,278; 2,462,463; 2,531,450; 3,223,817; and 4,131,780 disclose various types of underwater torches and their method of construction.

BRIEF SUMMARY OF THE INVENTION

In order to avoid the above-described problems and to provide an improved underwater cutting and welding torch it has been discovered that a one-piece insulating body anatomically shaped for the hand of a user (diver) which includes positive means to prevent water from contacting the electrically conducting parts of the torch and means to prevent escape of working fluid from the torch can be combined with improved electrode gripping means and variable positioning means for the gas valve thus providing a lightweight easy to operate torch. The one-piece construction enhances electrical insulation thus increasing safety in normal operation.

Improved electrode gripping results from the use of a collet with a tapered internal bore the collet having an external surface configuration to be used in conjunction with a complimentary surface on a collet ring to compress a substantial portion of the bore of the collet around gripping surface of the electrode.

The working fluid control apparatus (e.g. gas valve) is affixed to the torch body in a manner such that it can be moved about an axis defined by the main gas passage to facilitate positioning of the torch to the work piece without causing leakage of working fluid when the torch valve is moved in use.

BRIEF DESCRIPTION OF THE DRAWING

FIG. 1 is a front elevational view of a torch according to the present invention.

FIG. 2 is a side elevational view of the torch of FIG. 1.

FIG. 3 is a section of the torch body and electrical cable connector taken along lines 3—3 of FIG. 1, the valve not being sectioned.

FIG. 4 is a fragmentary sectional view taken along the lines 4—4 of FIG. 2.

FIG. 5 is an enlarged fragmentary longitudinal section of a portion of the torch of FIG. 1 detailing the electrode gripping mechanism.

FIG. 6 is an enlarged fragmentary longitudinal section of the apparatus of FIG. 2 showing an electrode in position for cutting or welding.

FIG. 7 is an enlarged fragmentary sectional view of that portion of the torch detailing the check valve flash arrestor assembly with the check valve positioned for normal torch operation.

FIG. 8 is identical to FIG. 7 except that the check valve is shown in position to prevent backflow through the gas passage.

DETAILED DESCRIPTION OF THE INVENTION

Underwater torches in commercial use generally consist of a number of sub-assemblies joined together by mechanical means and require complex sealing means and materials to prevent leakage of electrical current. When the torch is used for cutting it requires sealing means to prevent leakage of the working fluid which is usually high pressure oxygen.

Some of the commercial cutting and welding torches utilize a spring collet to secure the electrode and transfer current to the electrode. However prior art collets generally employ essentially a line contact around a portion of the periphery of the electrode to effect the clamping and electrical contact. With a small area of contact between the collet and the electrode, under normal operating conditions wherein the arc breaks and starts frequently the associated mechanical action can cause the electrode to become loosened in the collet and arcing can occur between the collet and the electrode. Loosening of the electrode can promote loss of the gas seal between the electrode and the primary gas passage. Present collet designs have two tapers one is acted upon by the collet ring which forces a second taper against the torch head to effect the gas seal between the collet and the primary gas passage in the torch head. The assembly may become tight without sufficient pressure being exerted upon the electrode or without forcing a good collet seal to the rubber gasket normally associated with the collet and the torch head. Thus oxygen often leaks around the collet.

Current commercial torches tend to be either heavy and bulky or light and small the latter having a relatively short service life.

Referring to the drawing and in particular FIGS. 1 and 2 the torch 10 of the present invention includes a gas operating lever assembly 12, an electrical cable assembly 14 and a collet ring assembly 16.

As shown in FIG. 3 the torch 10 includes a head 18 fabricated from a conductive metal such as copper. Depending from head 18 is a conductor 20 of a similar conductive metal such as copper. Conductor 20 terminates in a threaded portion 21 which is adapted to mate with complimentary threads 22 in cable adaptor 23 of cable assembly 14 which is in turn affixed to the conductor 26 of welding cable 25 thus permitting current to flow from conductor 26 of welding cable 25 to the torch head 18 via conductor 20.

Head 18 includes a central bore 30 which is counterboard to receive a check valve and flash arrestor assembly as shown more clearly in FIGS. 7 and 8. The forward end 34 of head 18 includes male threads 36 adapted to receive complimentary female threads on collet ring 38. Collet ring 38 includes an outer covering 40 of an insulating material formed to have gripping surfaces or projections 42 (FIG. 1 and FIG. 2).

Depending from head 18 and communicating with bore 30 is a fluid conduit 42 which in turn is connected to valve assembly 12 to control flow of a working fluid such as oxygen through the torch 10.

The subassembly of the torch head 18, conductor 20 and gas passage 42 are covered with a single insulating coating 44 of epoxy which is shaped to be easily gripped by the diver user. The coating or body 44 is formed to permit a recessed aperture 46 to receive the connector 48 of valve body 50 to permit coupling of valve body 50 to fluid passage conduit 42 as is well known in the art.

As shown in FIG. 4, connector 48 of valve body 50 has an annular groove 52 on its outer surface positioned to mate with diametrically opposed threaded apertures 54, 56 in body 44 which are in turn adapted to receive set screws 58 and 60 respectively. When valve assembly 12 is fixed to the torch body 44, valve body adaptor 48 is inserted into recess 46 to receive a projecting end (not shown) of conduit 42. Fluid tight seal 62 composed of a compressible washer and "O" ring is interposed between the conduit 42 and projection 48 of valve body 50 to effect a gas tight seal. By compressing the seal 62 and inserting set screws 58 and 60, sealing of the valve to the fluid conduit takes place. If the operator desires to rotate the gas operating assembly 12 to any other position (e.g. perpendicular to the plane of the paper) all he has to do is loosen the two set screws, rotate the gas operating lever assembly 12 and retighten the set screws 58, 60. While doing this the compressive seal 62 maintains the gas tight relationship between valve body 50 of the gas lever assembly 12 and conduit 42 since the axial position of the adaptor 48 has not changed while the transverse position may have.

Electrical connector 20 projects from a tapered conical recess 64 in body 44 to receive a sealing member such as O ring 24. When the welding cable assembly 14 is assembled to the adaptor 23, a covering sheath 66 of an insulating material such as heat shrinkable plastic is applied to seal the metal adaptor 23 and conductor 26 from the working environment of the torch. As the cable assembly 14 is threaded to the conductor 20, the plastic boot 66 is compressed against the O ring 24 thus preventing current from leaking out of the torch body 44 and conversely the environment from coming in contact with conductor 20.

Referring to FIGS. 5 and 6, the forward end of torch body 18 terminates in a stepped-down portion 68 containing male threads 36 as noted above. The stepped-down portion 68 of torch head 18 is adapted to receive a compressible annular sealing member 70 of a synthetic insulating material. Sealing member 70 must be compressible so that when collet assembly 38-40 is in place, a seal can be effected between insulating covering 40 and insulating ring 70 as will hereinafter be more fully described. Disposed partially within the inner bore of torch head 18 is a collet 72 which contains a first end 79 having a tapered aperture 76 communicating with a tapered internal bore 78 (FIG. 5). The tapered bore 78 of collet 72 tapers from a large opening adjacent to aperture 76 to a smaller diameter opening 80 at the second end 82, thus providing a negative taper from the first end 74 to the second end 82 of collet 72. On the first end of collet 72 is an outer angular circumferential surface 84 which is adapted to mate with a complimentary circumferentially shaped angular surface 84 on collet ring 38. Between the second end 82 of collet 72 and check valve-flash arrestor assembly 32 there is disposed a sealing member 88 in the form of a circular compressible washer made of an insulating material.

As shown in FIG. 6 when an electrode is inserted into the bore 78 of collet 72 and seated against sealing member 88, insulating cover 40 and collet ring 38 can be rotated causing collet ring 38 to move to the right as shown in the drawing. As collet ring 38 moves to the right, surface 86 wedges against surface 84 of collet 72 forcing collet 72 against sealing member 88 and forcing a substantial portion of the bore 78 of collet 72 to come in contact with the surface of the electrode 90. The surface of the electrode 90 contacting the collet is uncoated, the projecting portion of the electrode contains an insulating cover 92 which normally extends up to or inside of the bore of insulating cover 40, electrode 90 of FIG. 6 having more of coating 92 stripped away for illustration. Thus, when an electrode is inserted into the torch, as shown in FIG. 6, a gas tight seal is effected between the electrode and the gas passage by means of sealing member 88 being compressed between the end of electrode 90 and an annular shoulder in head 18. Current is carried to the electrode from conductor 42 to head 18 to collet ring 38 and to collet 72. Insulating cover 40 is forced against insulating ring 70 to further seal the collet ring assembly from the environment and to prevent electrical leakage to the environment.

FIGS. 7 and 8 show details of the check valve-flash arrestor assembly 32 of FIG. 3. The check valve-flash arrestor 32 includes an arrestor holder 100 adapted to receive and position a porous metal flash back arrestor 102. Flash back arrestor 102 may be a screen or other type apparatus as is well known in the welding art. Arrestor holder 100 includes a central passage 104 having an outwardly flared aperture 106 on one end adapted to receive and sealingly engage a check ball 108. On the other end passage 104 of arrestor holder 100 is adapted to mate with internal passage 110 of flash arrestor 102 as is well known in the art. Arrestor holder 100 is adapted to mate with check cage 112 which contains an internal passage 114 communicating with the internal passage 104 of arrestor holder 100 and internal passage 110 of arrestor 102 and in turn with fluid conduit 42 to permit working fluid such as high pressure oxygen to be conducted through valve assembly 12 through conduit 42 and to the electrode 90 (FIG. 6). Ball check cage 112 is adapted to permit movement of the check ball 108 to seat in a dual hemispherical receiving section 116 which permits fluid to flow past the ball check when it is in the extreme left position as shown in FIG. 7 to a smaller diameter bore 118 in check ball cage 112. As shown in FIG. 8, when the flow of working fluid is terminated any back pressure through the bore of the electrode or through the bore of electrode 90 will cause the ball 108 to move to the right and seat against surface 106 of arrestor holder 100 thus preventing gas from being forced back toward the source of working fluid.

When a torch, according to the present invention is assembled, the body 44 being of unitary construction insulates a major portion of the torch head 18, gas conduit 44 and conductor 20 from the hand of the diver (user). Sealing means 62 (FIGS. 3 and 4) permits the diver to vary the position of the gas operating lever assembly 12 without affecting the seal between the valve 50 and conduit 42. Electrical cable assembly 14 is sealingly connected to the torch 10 and integrity of insulation between the torch body 44 and cable assembly 14 is maintained by means of the "O" ring 24 and boot 66.

The electrode 90 is gripped along a major portion of its surface because of the negative tapered bore 78 of collet 72 as shown in FIGS. 5 and 6. A gas seal is effected between the collet 72 and gas passage 30 in head 18 by means of sealing member 88.

The collet ring 38-insulating cover 40 assembly communicates through the tapered surface 86 to a complimentary tapered surface 84 on collet 72 to compress the collet 72 around the electrode 90 to force both the collet 72 and electrode 90 against seal 88 without obstruction. Collet 72 is not compressed against head 18 except by transmission of force through the seal 88, thus insuring a sealing action to prevent escape of the working fluid (e.g. oxygen gas) at the point where collet 72, electrode 90 and seal 88 meet.

From the foregoing, it is apparent that a light weight anatomically compatible underwater cutting and welding torch can be achieved which is adapted to provide a safer torch for the diver (user). Potential leakage points are minimized because there are no multiple subassemblies as in the prior art torches.

Having thus described our invention, what is desired to be secured by Letters Patent of the United States is set out in the following claims.

We claim:

1. In an underwater cutting and welding torch of the type including an electrically conductive head including means for gripping an electrode for positioning relative to a workpiece, said head further adapted to permit working fluid to be admitted to a passage in said electrode, said torch including means to connect said head to a source of electrical current and, valve means to admit fluid to said head the improvement comprising:
a one-piece insulating body having a shape adapted to be held comfortably by a user thus enabling said user to easily direct said electrode at said workpiece said body further constructed and arranged, in combination with positive sealing means, to exclude water from contacting the electrically conductive portions of said torch at those locations where said valve means communicates with said head through a passage in said body, where an electrical conductor contacts said means to connect said head to a source of electrical current and between said body and removable gripping means mounted for electrical contact with said head to grip said electrode thus preventing movement of said electrode during a cutting or welding operation, said body further adapted to prevent escape of working fluid from said torch.

2. A torch according to claim 1 wherein there is included a check valve and flash arrestor assembly to prevent back flow of water and other foreign objects into said torch body, said assembly being so constructed and arranged to facilitate manufacture and field repair.

3. A torch according to claim 1 wherein the electrode gripping means includes a spring collet having a first and second end and a longitudinal bore therethrough said first end adapted to receive an electrode inserted into said internal bore said bore tapering separately from said first end to said second end.

4. A torch according to claim 3 wherein said first end of said collet includes a male angular circumferential surface adapted to mate with a complimentary female angular circumferential surface on a collet ring whereby when said collet ring is urged against said collet, said collet bore closes about said electrode along a substantial portion of the surface of said bore.

5. A torch according to claim 1 wherein said valve means includes a valve body adaptor containing an annular recess said recess positionable in juxtaposition to movable locking means said locking means operable to enable positioning of said valve and a valve operating means associated therewith in varying positions relative to said torch head while maintaining a fluid tight seal between said valve and said torch body.

6. In an underwater cutting and welding torch of the type including an electrically conductive head including means for securely gripping an electrode for positioning relative to a workpiece, said head adapted to permit working fluid to be admitted to a passage in said electrode, said torch including means to connect said head to a source of electrical current the improvement comprising:
a spring collet having a first and second end and a longitudinal bore therethrough said first end adapted to facilitate insertion of an electrode into said bore, said bore tapering negatively from said first end to said second end;
said first end of said collet including a male angular circumferential surface adapted to mate with a complimentary female surface on a collet ring whereby when said collet ring is urged against said collet said collet bore closes about said electrode along a substantial portion of the surface of said bore.

* * * * *

UNITED STATES PATENT AND TRADEMARK OFFICE
CERTIFICATE OF CORRECTION

PATENT NO. : 4,361,746
DATED : November 30, 1982
INVENTOR(S) : David E. Johnson and Alexander Toth It is certified that error appears in the above–identified patent and that said Letters Patent are hereby corrected as shown below:

Cover Sheet
    Assignee: Air Products and Chemicals, Inc., Allentown, Pa.--should read-- Arcair Company, Lancaster, Ohio Signed and Sealed this Fourth Day of October 1983

[SEAL]

Attest:

GERALD J. MOSSINGHOFF

*Attesting Officer*     *Commissioner of Patents and Trademarks*